No. 724,547. PATENTED APR. 7, 1903.
H. H. COOKE.
HOT MEAL PORTABLE CABINET.
APPLICATION FILED SEPT. 12, 1901.
NO MODEL.

Witnesses
R. Shields
L. Trimble

Inventor:
H. H. Cooke

UNITED STATES PATENT OFFICE.

HELEN HARRIET COOKE, OF TORONTO, CANADA.

HOT-MEAL PORTABLE CABINET.

SPECIFICATION forming part of Letters Patent No. 724,547, dated April 7, 1903.

Application filed September 12, 1901. Serial No. 75,189. (No model.)

*To all whom it may concern:*

Be it known that I, HELEN HARRIET COOKE, gentlewoman, of the city of Toronto, in the county of York, in the Province of Ontario, Canada, have invented certain new and useful Improvements in Hot-Meal Portable Cabinets, of which the following is a specification.

My invention relates to improvements in hot-meal cabinets; and the object of the invention is to devise a cabinet of this class by which hot cooked victuals may be served to families in different houses or apartments or in apartment-houses ready for the table, and thereby avoid cooking in private families; and it consists, essentially, of a cabinet made of metal, a hot-water tank, hollow walls made to communicate with the said tank, the portion above being suitably spaced for cooked eatables, the portion below the tank for the heater and the dessert, and the parts being otherwise arranged and constructed as hereinafter more particularly explained.

Figure 1:
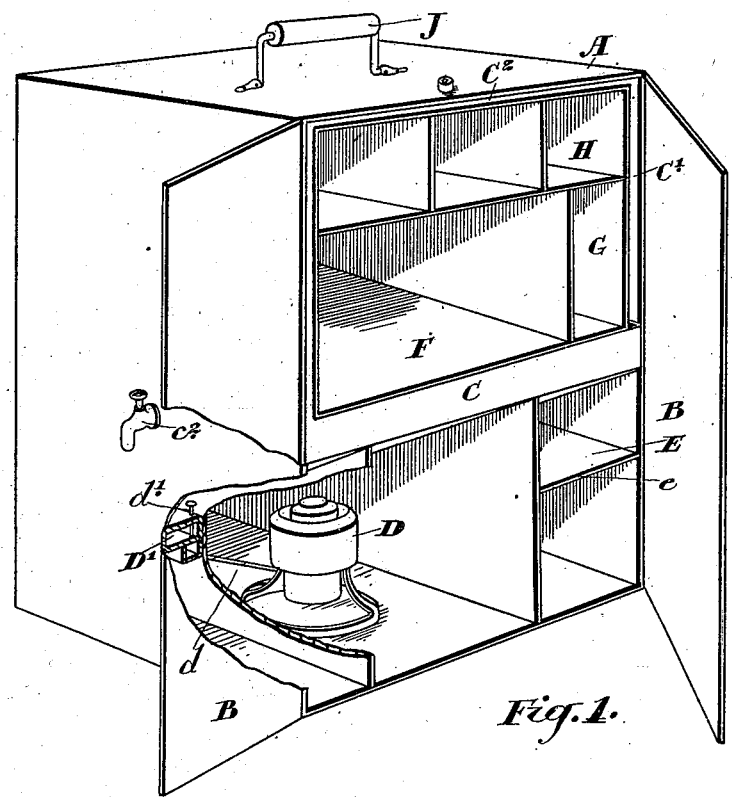
Figure 2:
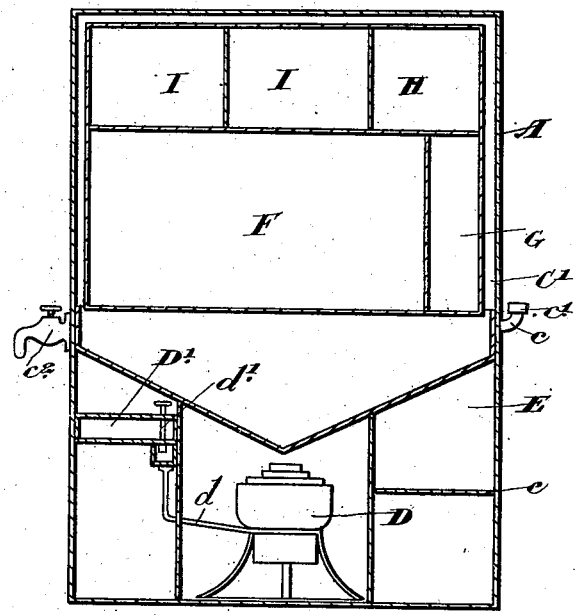

Figure 1 is a perspective view of my cabinet with lower portion of cabinet broken away and doors open to show the interior construction. Fig. 2 is a longitudinal section.

In the drawings like letters of reference indicate corresponding parts in each figure.

A is the casing of the cabinet, which is preferably rectangular in form.

B B are the front doors.

C is the water-tank, which is provided with a reverse cone-shaped bottom. The tank C is provided with a filling-elbow $c$, which extends from one side of the tank.

$c'$ is a stopper for closing the filling-elbow.

$c^2$ is a tap located on the opposite side of the tank and designed to draw off hot water.

D is what is known as a "blue-flame" heater, which is supplied from the tank D' by means of a pipe $d$, provided with a suitable needle-valve $d'$ for controlling the flow of petroleum.

E is a chamber located at one side of the heater D and provided with a shelf $e$. The chamber E is designed to receive the dessert for the table.

C' is a hollow wall which communicates at the bottom with the tank C and at the top with hollow top $C^2$.

F is the space for the joint of meat.

G is the space for the soup, which is placed in high cans.

H is the space for the fish, and I is the space arranged for the vegetables.

All the spaces are arranged as may be most convenient; but I think the arrangement which I have shown is the preferable one, in which spaces dishes may be placed which may be removed for the purpose of cleansing.

J is the handle, by which the cabinet is carried to the family for which it is intended. The doors of course will then be locked.

The heater D is intended to be kept burning sufficiently so as to maintain the water in the tank preferably at boiling-point, and the steam arising from the hollow walls C' and from the top $C^2$ will escape through a safety-valve at $C^3$. It will thus be seen that the victuals above the tank will be surrounded by heat, and consequently will be kept warm.

The space E, in which the dessert is placed, will also be kept warm on account of its proximity to the hot-water tank and heater D.

By such a cabinet as I describe the most trying portion of the family cooking will be dispensed with, and the meals can be served hot to families with the greatest facility. I preferably provide small openings in the wall of the cabinet beneath the bottom of the tank, so as to allow the escape of the products of combustion.

What I claim as my invention is—

A hot-meal cabinet comprising a rectangular casing having a rigid top bottom, sides and back and an open front, doors closing the same, a horizontal water-tank located approximately centrally of the height of said casing, an inner rectangular casing located in the space above said water-tank and having a solid top, bottom, sides and back and an open front, the top and walls of said inner casing being spaced from the walls and top of the outer casing to form a steam-jacket, partitions in said inner casing forming victual-spaces, partitions in the space below the water-reservoir forming a central and side compartments, and a heater in the central compartment, substantially as described.

HELEN HARRIET COOKE.

Witnesses:
H. T. S. YOUNG,
L. TRIMBLE.